(12) United States Patent
Lee

(10) Patent No.: US 7,694,122 B2
(45) Date of Patent: Apr. 6, 2010

(54) ELECTRONIC DEVICE AND BOOTING METHOD THEREOF

(75) Inventor: Sang-hyong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 881 days.

(21) Appl. No.: 11/370,805

(22) Filed: Mar. 9, 2006

(65) Prior Publication Data

US 2006/0271778 A1 Nov. 30, 2006

(30) Foreign Application Priority Data

May 25, 2005 (KR) ............... 10-2005-0044023

(51) Int. Cl.
*G06F 9/24* (2006.01)
*G06F 15/177* (2006.01)

(52) U.S. Cl. ............... 713/2; 713/1; 713/100; 711/100; 711/170

(58) Field of Classification Search ............ 713/2, 713/1, 100; 711/100, 170
See application file for complete search history.

(56) References Cited

U.S. PATENT DOCUMENTS

| | | | | |
|---|---|---|---|---|
| 4,729,091 A | * | 3/1988 | Freeman et al. | 711/147 |
| 5,355,498 A | | 10/1994 | Provino et al. | |
| 5,687,336 A | * | 11/1997 | Shen et al. | 712/202 |
| 6,240,358 B1 | * | 5/2001 | Kawai | 701/114 |
| 6,662,298 B2 | | 12/2003 | Heller | |
| 7,149,890 B2 | * | 12/2006 | Justen | 713/2 |
| 7,322,029 B2 | * | 1/2008 | Diaz | 717/168 |

FOREIGN PATENT DOCUMENTS

| | | |
|---|---|---|
| KR | 10-2001-0087868 A | 9/2001 |
| KR | 10-2003-0003945 A | 1/2003 |
| KR | 10-2003-0074106 A | 9/2003 |
| WO | WO 01-59565 A2 | 8/2001 |

* cited by examiner

*Primary Examiner*—Thomas Lee
*Assistant Examiner*—Michael J Brown
(74) *Attorney, Agent, or Firm*—Roylance, Abrams, Berdo and Goodman, LLP

(57) ABSTRACT

An electronic device and a booting method thereof are provided, wherein the method includes the steps of copying the boot image from the first non-volatile memory to the internal RAM when a booting operation of the electronic device begins, setting a stack pointer in the internal RAM by executing a control code to set the stack pointer among control codes of the boot image, and activating the main memory by executing a control code to initialize the main memory controller and activate the main memory among the control codes of the boot image, the control code to initialize the main memory controller and activate the main memory using the stack pointer. Accordingly, since the control code to initialize the main memory controller to activate the main memory is written in a high-level programming language instead of assembly language, the display device can be driven before the main memory is activated.

18 Claims, 6 Drawing Sheets

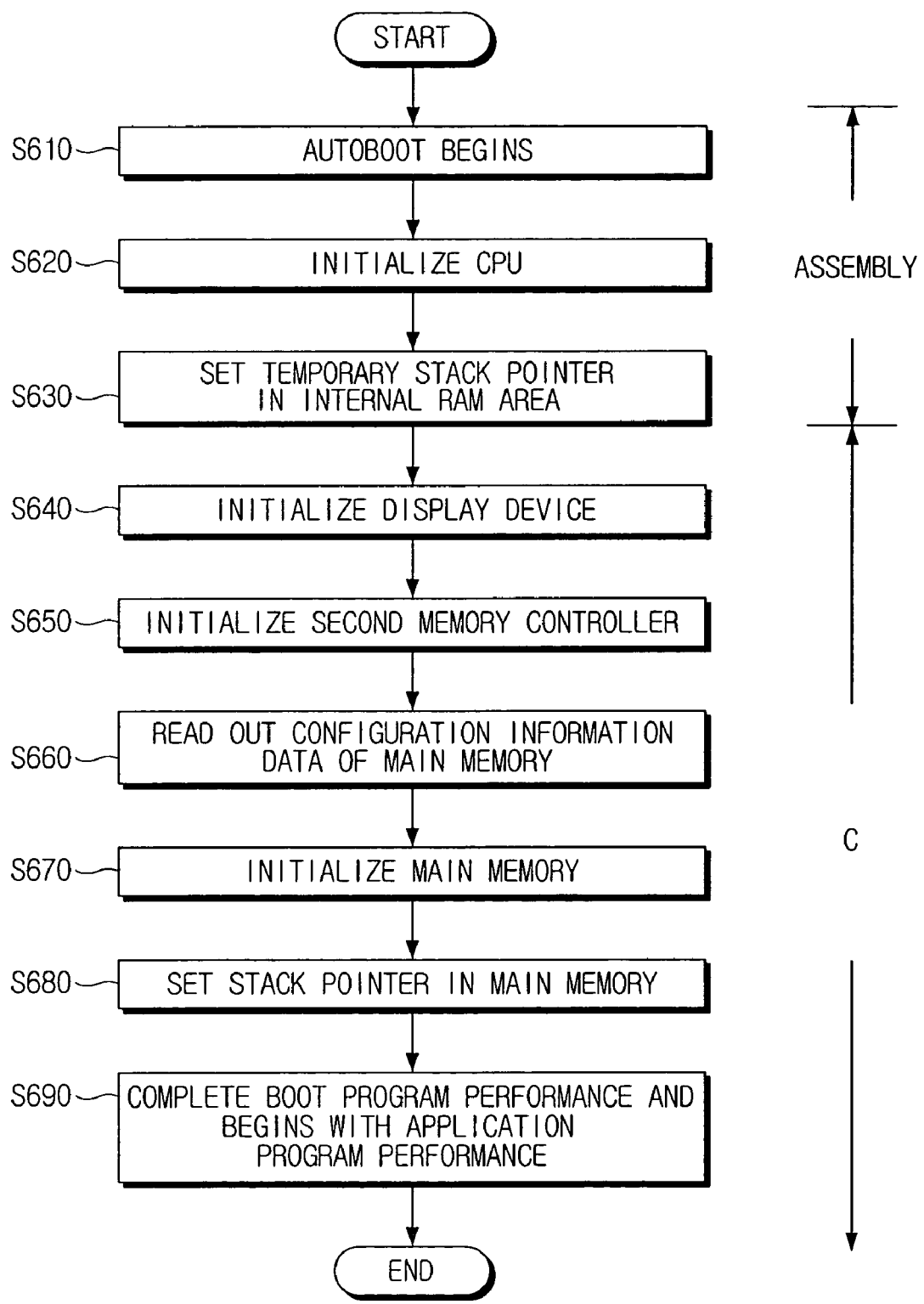

ELECTRONIC DEVICE AND BOOTING METHOD THEREOF

CROSS-REFERENCE TO RELATED APPLICATIONS

This application claims the benefit under 35 U.S.C. §119 (a) of Korean Patent Application No. 10-2005-0044023, filed in the Korean Intellectual Property Office on May 25, 2005, the entire disclosure of which is incorporated herein by reference.

BACKGROUND OF THE INVENTION

1. Field of the Invention

The present invention relates to an electronic device and a booting method thereof. More particularly, the present invention relates to an electronic device which performs a booting operation by executing a control code written in a high-level programming language before activating a main memory, and a booting method thereof.

2. Description of the Related Art

FIG. 1 is a block diagram showing a conventional electronic device. Referring to FIG. 1, an electronic device 100 comprises a system on chip 110, a memory module 120 and a NAND flash memory 130. The system on chip 110 comprises a central processing unit (CPU) 111, a memory controller 112, an I2C controller 113, a NAND flash controller 114, an internal RAM 115, and a system bus 116. The memory module 120 comprises a DRAM 121 and a serial presence detect (SPD) 122.

FIG. 2 is a flowchart illustrating a booting operation of the conventional electronic device of FIG. 1, and FIG. 3 is a view illustrating an example of a memory map of a conventional boot program.

Hereinafter, the booting operation of the conventional electronic device 100 will be described with reference to FIGS. 1 to 3.

When an autoboot of the electronic device 100 begins, the NAND flash controller 114 automatically copies a boot image stored in the NAND flash memory 130 to the internal RAM 115 at operation S210. The boot image is shown in FIG. 3.

At operation S220, the CPU 111 initializes an environment setting register provided in the CPU 111 by executing a control code of the boot image that corresponds to an initialization of the CPU 111.

At operation S230, the CPU 111 initializes the I2C controller 113 by executing a control code corresponding to an initialization of the I2C controller 113. At operation S240, the CPU 111 reads out data about configuration information of the memory module 120 from the SPD 122 by executing a control code corresponding to the SPD 122. At operation S250, the CPU activates the DRAM 121 by initializing the memory controller 112 to conform to the memory module 120 using the read-out data.

The CPU 111 sets a stack pointer in an area of the activated DRAM 121 at operation S260. As shown in FIG. 3, a certain block of the DRAM 121 is used as a stack area. The CPU 111 activates a liquid crystal display (LCD) panel (not shown) by executing a control code that is written in a C-language and corresponds to an initialization of the LCD panel at operation S270. Finally, the CPU 111 completes the execution of the boot program and then begins performing an application program at operation S280.

According to the conventional booting procedure as described above, only the control code based on assembly language is executed before the DRAM 121 is activated to set the stack by the stack pointer therein. Therefore, the control code corresponding to the initialization of the memory controller 112 must be written based on assembly language, which makes it difficult for a developer to intuitively understand.

If the electronic device is an embedded system requiring a high-capacity and high-speed memory, the electronic device uses a commercial memory module for the purpose of achieving system expansion and easy design, instead of using a memory device directly installed to the system on chip. In order to use the commercial memory module, the memory controller has to be initialized based on configuration information of the memory module recorded to the EEPROM (hereinafter referred to as serial presence detect (SPD)) mounted in the memory module.

Therefore, in the conventional device, the control code to initialize the memory controller has to be written based on assembly language, and also, a control program has to be re-written to be suitable to the CPU because the assembly language commands are different depending on the CPU model.

Since a device driver to initialize and operate a display device (not shown) such as an LCD panel, is generally written in a high-level programming language such as C, C++, and Java, it is driven after the DRAM area is activated by reading data necessary for the initialization of the memory controller from the SPD. However, since the SPD uses the EEPROM of a low transmission rate ranging from 10 kbps to 400 kbps, a large amount of time is required to initialize the memory controller and activate the DRAM area after power is applied to the system. Therefore, it takes a user a large amount of time to determine an operation status of the system through the display device, and it is often the case that a user incorrectly determines that the system is not operating.

Accordingly, a need exists for a system and method for effectively and efficiently improving at least a booting operation.

SUMMARY OF THE INVENTION

Embodiments of the present invention have been developed in order to substantially solve the above and other problems in the related art. Accordingly, an aspect of embodiments of the present invention is to provide an electronic device which performs a booting operation by executing a control code written in a high-level programming language before activating a main memory, and a booting operation thereof.

These and/or other aspects are achieved by providing an electronic device comprising a first non-volatile memory to record a boot image about the electronic device, and a main memory controller to control a data input/output between the CPU and the main memory. The boot image is configured such that a control code to set a stack pointer in the internal RAM is executed earlier than a control code to activate the main memory by initializing the main memory controller.

Preferably, but not necessarily, the electronic device further comprises a first memory controller to automatically copy the boot image from the first non-volatile memory to the internal RAM when a booting operation of the electronic device begins, and to control the boot image to be executed by the CPU.

Preferably, but not necessarily, the electronic device further comprises a display device, and the boot image further comprises a control code to initialize the display device. The control code to initialize the display device is executed between the control code to set the stack pointer in the internal RAM and the control code to activate the main memory.

Preferably, but not necessarily, the electronic device further comprises a second non-volatile memory to record configuration information data of the main memory, and a second memory controller to control a data input/output between the CPU and the second non-volatile memory. The boot image further comprises a control code to initialize the second memory controller and read out the configuration information data of the main memory from the second non-volatile memory. The control code to initialize the second memory controller and read out the configuration information data is executed between the control code to set the stack pointer in the internal RAM and the control code to activate the main memory.

Preferably, but not necessarily, the CPU initializes the main memory controller and sets the stack pointer in the main memory using the control code to initialize the main memory controller and the read-out configuration information data of the main memory.

Preferably, but not necessarily, at least one of the control code to initialize the main memory controller, the control code to initialize the display device, and the control code to read out the configuration information data of the main memory, is written in a high-level programming language.

Preferably, but not necessarily, the high-level programming language comprises one of C, C++ and Java.

Preferably, but not necessarily, the first non-volatile memory comprises one of a NAND flash memory and an EEPROM, and the second non-volatile memory is an EEPROM.

Preferably, but not necessarily, the second memory controller comprises an I2C controller.

These and/or other aspects are also achieved by providing a booting method of an electronic device which comprises a CPU, an internal RAM, a main memory, a main memory controller to control a data input/output between the CPU and the main memory, and a first non-volatile memory recording a boot image. The method comprises the steps of copying the boot image from the first non-volatile memory to the internal RAM when a booting operation of the electronic device begins, setting a stack pointer in the internal RAM by executing a control code to set the stack pointer among control codes of the boot image, and activating the main memory by executing a control code to initialize the main memory controller and activate the main memory among the control codes of the boot image, the control code to initialize the main memory controller and activate the main memory using the stack pointer.

Preferably, but not necessarily, the method further comprises the steps of initializing the display device by executing a control code to initialize the display device among the control codes of the boot image, the control code to initialize the display device being executed between the stack pointer setting step and the main memory activating step.

Preferably, but not necessarily, the method further comprises reading out the configuration information data by executing a control code to read out the configuration information data from a second non-volatile memory among the control codes of the boot image. The control code to read out the configuration information data is executed between the stack pointer setting step and the main memory activating step, and the main memory activating step initializes the main memory controller using the read-out configuration information data and activates the main memory.

Preferably, but not necessarily, the method further comprises the step of setting a stack pointer in the activated main memory.

BRIEF DESCRIPTION OF THE DRAWINGS

These and/or other aspects of embodiments of the present invention will become apparent and more readily appreciated from the following description of the embodiment, taken in conjunction with the accompanying drawings, of which:

FIG. 6 is a flowchart illustrating an exemplary booting operation of the electronic device of FIG. 4.

Throughout the drawings, like reference numerals will be understood to refer to like parts, components and structures.

DETAILED DESCRIPTION OF EXEMPLARY EMBODIMENTS

Hereinafter, embodiments of the present invention will now be described in greater detail with reference to the accompanying drawings.

Figure 1:
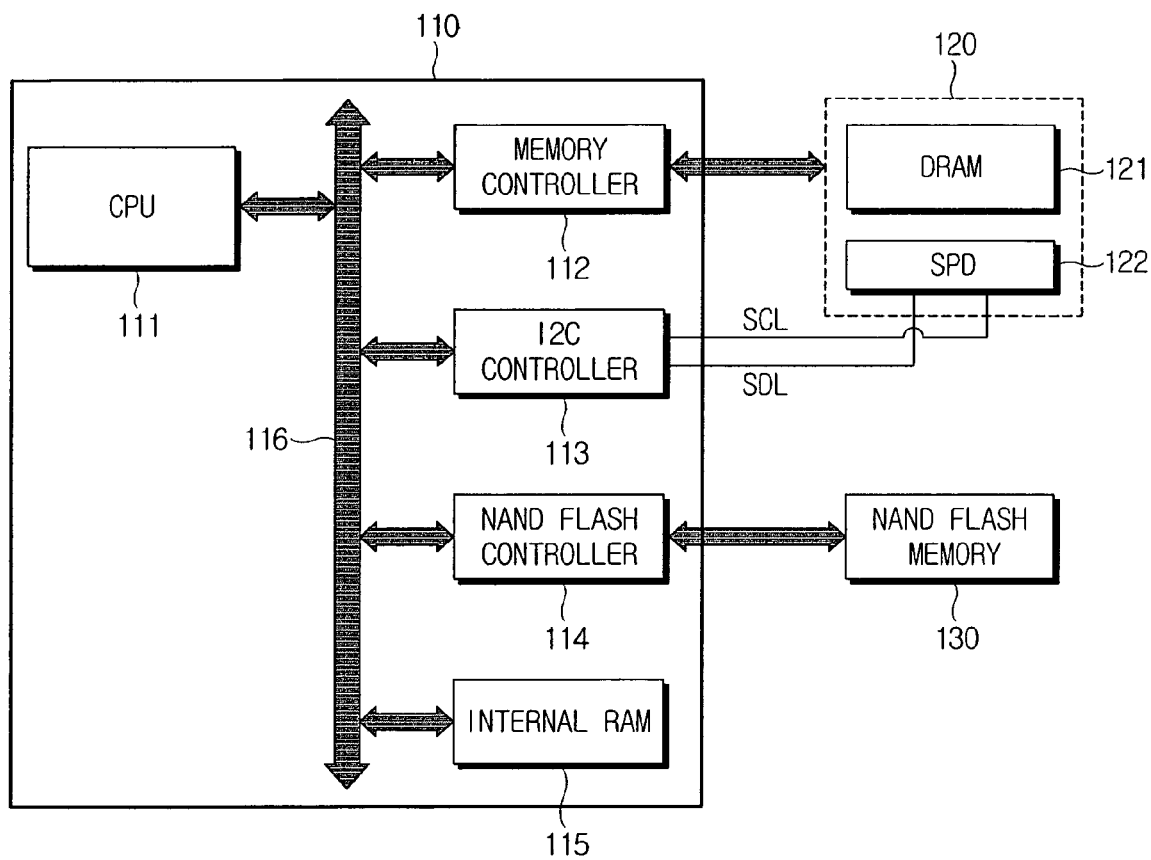
FIG. 1 is a block diagram illustrating a conventional electronic device.
Figure 2:
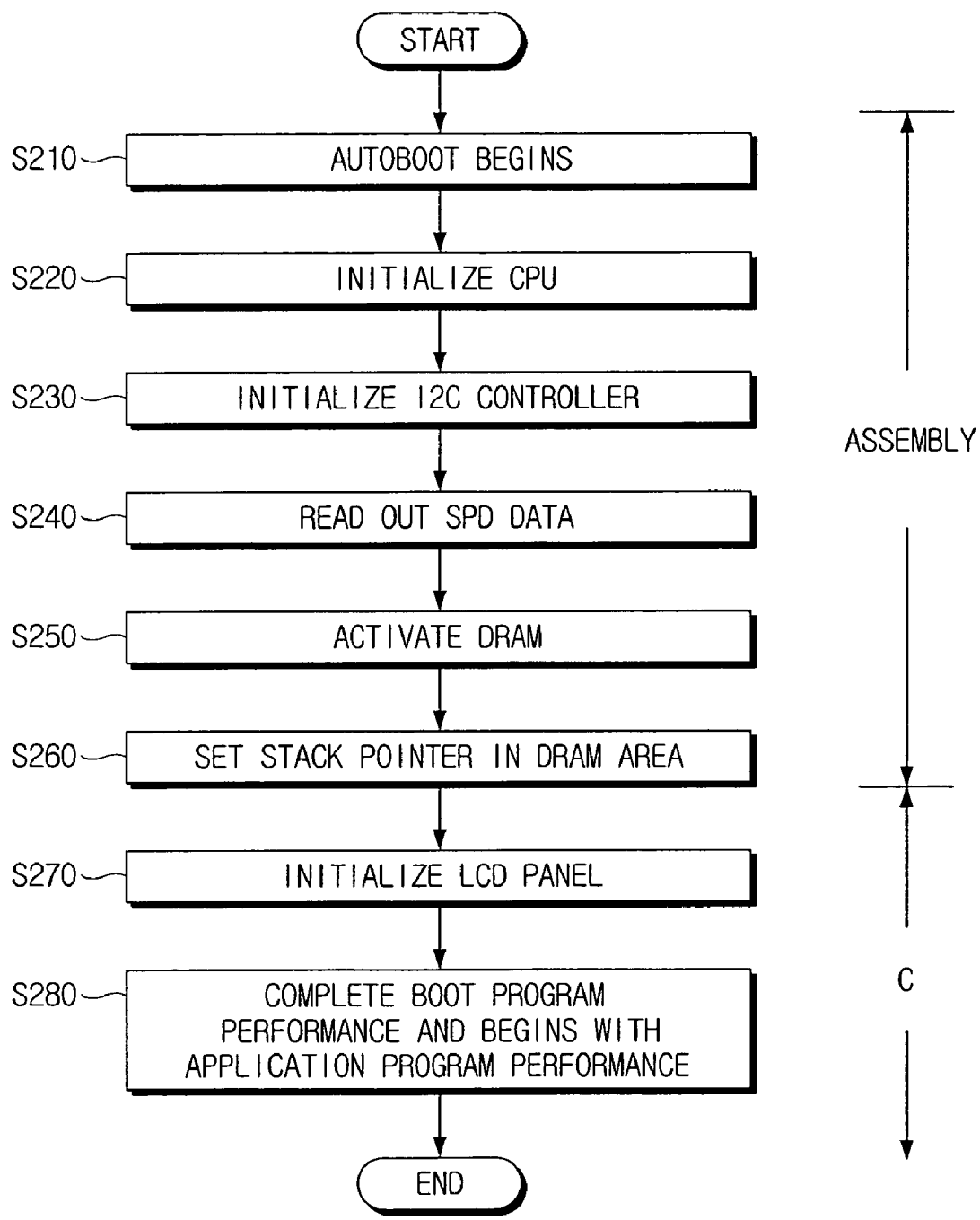
FIG. 2 is a flowchart illustrating a booting operation of the conventional electronic device of FIG. 1.
Figure 3:
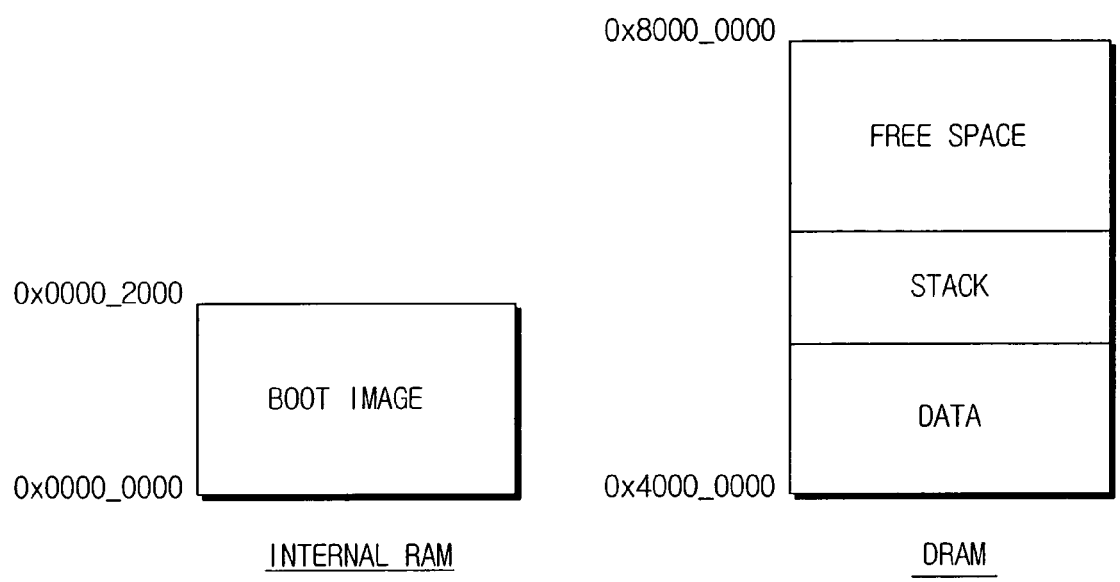
FIG. 3 is a view illustrating a memory map of a conventional boot program.
Figure 4:
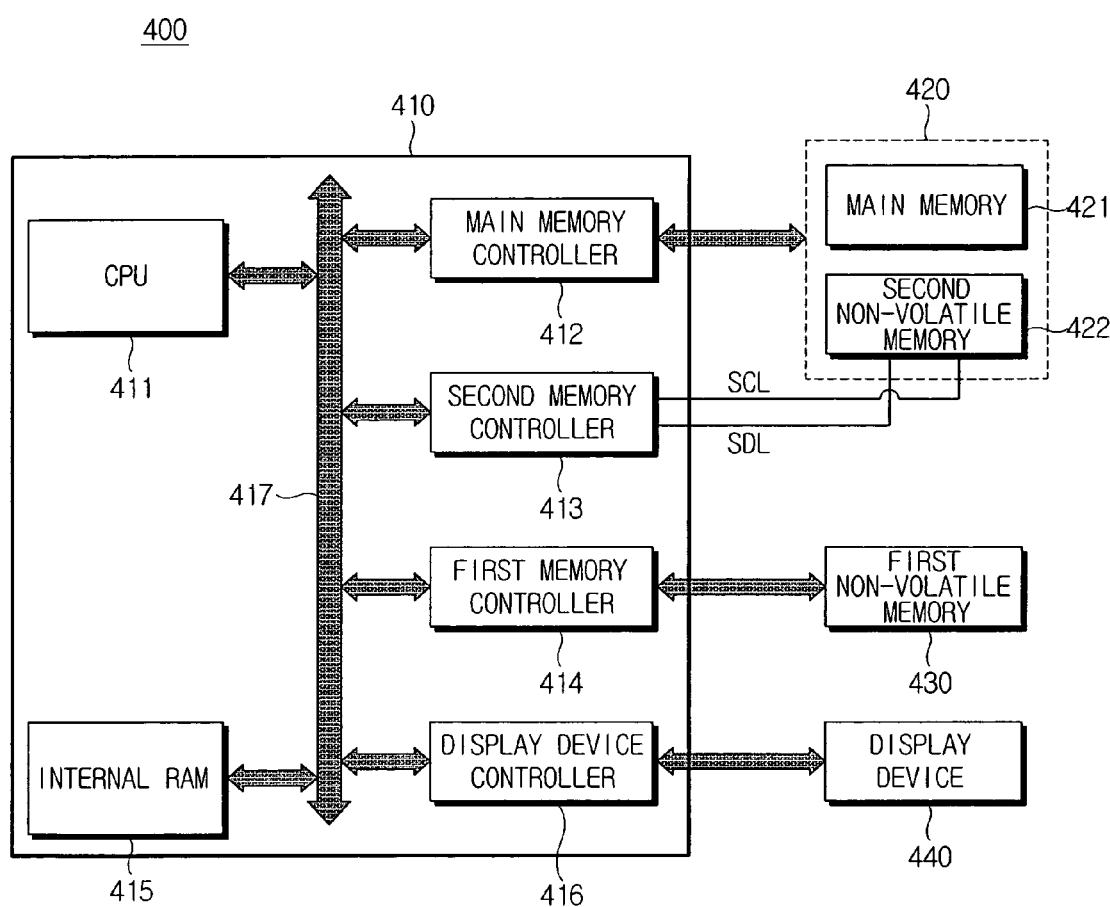
FIG. 4 is a block diagram illustrating an exemplary electronic device according to an embodiment of the present invention.

FIG. 4 is a block diagram illustrating an exemplary electronic device according to an embodiment of the present invention.

Referring to FIG. 4, an electronic device 400 according to embodiments of the present invention comprises a system on chip 410, a memory module 420, a first non-volatile memory 430, and a display device 440. The system on chip 410 comprises a CPU 411, a main memory controller 412, a first memory controller 414, a second memory controller 413, an internal RAM 415, a display device controller 416, and a system bus 417. The memory module 420 comprises a main memory 421 and a second non-volatile memory 422.

The CPU 411 deciphers a command of a program to execute the command. More specifically, the CPU 411 controls the electronic device 400 to be booted up by executing a control code of a boot image using data included in the boot image and configuration information data of the main memory 421 recorded to the second non-volatile memory 422.

The main memory controller 412 controls a data input/output between the CPU 411 and the main memory 421.

The first memory controller 414 controls a data input/output between the CPU 411 and the first non-volatile memory 430.

The second memory controller 413 controls a data input/output between the CPU 411 and the second non-volatile memory 422, and performs an I2C communication between the second non-volatile memory 422 and the CPU 411 through a serial clock (SCL) and serial data link (SDL).

The display device controller 416 controls the display device 440 according to a command executed by the CPU 411.

The internal RAM 415 acts as a cache for the CPU 411, the main memory 421, or the first non-volatile memory 430, and is embodied by a memory element such as an SRAM for example. More specifically, the internal RAM 415 copies the boot image from the first non-volatile memory 430 under the control of the first memory controller 414 when a booting operation begins with respect to the electronic device 400. A certain area of the internal RAM 415 is temporarily used as a stack before the main memory 421 is activated. Accordingly, it is possible to execute a control code written in a high-level programming language such as C, C++, and Java, even if a stack pointer is not set in the main memory 421.

The system bus 417 bridges the respective parts disposed in the system on chip 410. The memory module 420 comprises the main memory 421 and the second non-volatile memory 422. The main memory 421 may be embodied by a DRAM, and the second non-volatile memory 422 records data about the configuration information of the main memory 421 such as information about size, configuration, and timing of the main memory 421, and may be embodied by an EEPROM for example. Generally, a memory element mounted in the memory module 420 and recording the data about the configuration information of the main memory 421 is called 'serial presence detect' (SPD).

The first non-volatile memory 430 records control codes necessary for the booting operation of the electronic device 400 and a boot image having structured data, and uses a NAND flash memory or an EEPROM for example.

The display device 440 displays an operation status of the electronic device 400 or an image realized by the electronic device 400, and may be embodied by an LCD panel for example.

According to embodiments of the present invention, the boot image is configured such that a control code to set a stack pointer in the internal RAM 415 is executed by the CPU 411 earlier than a control code to activate the main memory 421 by initializing the main memory controller 412. Thus, a temporary stack area is set in the internal RAM 415, as shown in FIG. 5, using a stack pointer of the CPU 411 before a stack area is set in the main memory 421.

Accordingly, the control code written in a high-level programming language is executed, and so it is possible to operate the display device 440 before the main memory 421 is activated. In addition, since a control code to initialize the second memory controller 413 and a control code to read the configuration information data of the main memory 421 from the second non-volatile memory 422 are executed before the main memory 421 is activated, these control codes can be written in a high-level programming language instead of assembly language.

FIG. 6 is a flowchart showing an exemplary booting operation of an electronic device according to an embodiment of the present invention.

Figure 5:
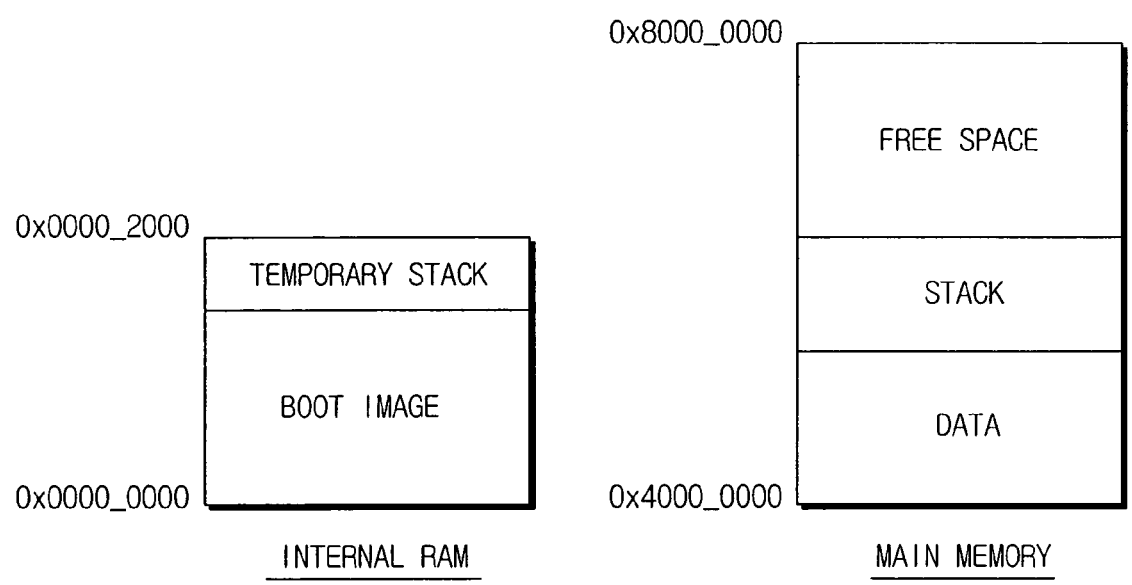
FIG. 5 is a view illustrating an exemplary memory map of a boot program according to an embodiment of the present invention.

Referring to FIGS. 4 to 6, when an autoboot of the electronic device 400 begins, the first memory controller 414 controls the boot image stored in the first non-volatile memory 430 to be automatically copied to the internal RAM 415 at operation S610.

At operation S620, the CPU 411 initializes a environment setting register in the CPU 411 by executing a control code to initialize the CPU 411 among the boot image copied to the internal RAM 415.

At operation S630, the CPU 411 establishes a temporary stack area in the internal RAM 415 as shown in FIG. 5 by executing a control code to set a stack pointer in the internal RAM 415. FIG. 5 is a view illustrating an exemplary memory map of a boot program according to an embodiment of the present invention. To this end, since the stack pointer of the CPU 411 can be used, the control code written in a high-level programming language is in condition for execution by the CPU 411.

The CPU 411 executes a control code to initialize the display device 440, which is written in a high-level programming language, using the stack pointer set in the internal RAM at operation S640. Accordingly, a user is able to visually check an operation status of the electronic device 400 through the display device 440.

At operation S650, the CPU 411 initializes the second memory controller 413 by executing a control code to initialize the second memory controller 413. At operation S660, the CPU 411 reads out the configuration information data of the main memory 421 by executing a control code written in a high-level programming language to read the configuration information data of the main memory 421.

At operation S670, the CPU 411 activates the main memory 421 by executing a control code written in a high-level programming language to initialize the main memory controller 412 using the read-out configuration information data of the main memory.

At operation S680, the CPU 411 sets a stack pointer in an area of the activated main memory 421 and thus, can use a certain block of the main memory 421 as a stack area. Finally, at operation S690, the CPU 411 completes the booting operation and begins performing an application program.

According to embodiments of the present invention, the temporary stack area is set in the internal RAM 415 such that the control codes written in the high-level language can be executed before the main memory 421 requiring a large amount of time to be activated, is activated.

Since the control code to read the configuration information data of the main memory 421 from the SPD in order to activate the main memory 421 and the control code to initialize the main memory controller 412, are both developed by using the high-level programming language such as C, C++ or Java, which is intuitively comprehensible by a developer instead of using assembly language, any debugging is facilitated and a developing time can be reduced. Since the control code is written in the high-level language instead of using assembly language, the same control code can be used for the different CPUs.

Since the display device 400 can be driven before the main memory 420 is activated, it can satisfy user's demand for a rapid driving time.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An electronic device comprising:
   a CPU;
   an internal RAM in communication with the CPU;
   a main memory in communication with the CPU;
   a first non-volatile memory in communication with the CPU to record a boot image about the electronic device;
   a main memory controller in communication with the CPU to control data input/output between the CPU and the main memory; and
   a display device,
   wherein the boot image is configured such that a control code to set a temporary stack pointer in the internal RAM is executed earlier than a control code to activate the main memory by initializing the main memory controller, and wherein the boot image further comprises a control code to initialize the display device, the control code to initialize the display device being executed between the control code to set the temporary stack pointer in the internal RAM and the control code to activate the main memory.

2. The electronic device as claimed in claim 1, wherein at least one of the control code to initialize the main memory controller, the control code to initialize the display device and the control code to read out the configuration information data of the main memory is written in a high-level programming language.

3. The electronic device as claimed in claim 2, wherein the high-level programming language comprises one of C, C++ and Java.

4. An electronic device comprising:

a CPU;

an internal RAM in communication with the CPU;

a main memory in communication with the CPU;

a first non-volatile memory in communication with the CPU to record a boot image about the electronic device;

a main memory controller in communication with the CPU to control data input/output between the CPU and the main memory;

a second non-volatile memory to record configuration information data of the main memory; and a second memory controller to control data input/output between the CPU and the second non-volatile memory, wherein the boot image is configured such that a control code to set a temporary stack pointer in the internal RAM is executed earlier than a control code to activate the main memory by initializing the main memory controller, and wherein the boot image further comprises a control code to initialize the second memory controller and read out the configuration information data of the main memory from the second non-volatile memory, the control code to initialize the second memory controller and read out the configuration information data being executed between the control code to set the temporary stack pointer in the internal RAM and the control code to activate the main memory.

5. The electronic device as claimed in claim 4, wherein the CPU is configured to:

initialize the main memory controller and set a stack pointer in the main memory using the control code to initialize the main memory controller and the read-out configuration information data of the main memory.

6. The electronic device as claimed in claim 4, wherein at least one of the control code to initialize the main memory controller, the control code to initialize the display device and the control code to read out the configuration information data of the main memory is written in a high-level programming language.

7. The electronic device as claimed in claim 6, wherein the high-level programming language comprises one of C, C++ and Java.

8. The electronic device as claimed in claim 4, wherein the second non-volatile memory comprises an EEPROM.

9. The electronic device as claimed in claim 4, wherein the second memory controller comprises an I2C controller.

10. A booting method of an electronic device which comprises a CPU, an internal RAM, a main memory, a main memory controller to control data input/output between the CPU and the main memory, and a first non-volatile memory for recording a boot image, the method comprising:

copying the boot image from the first non-volatile memory to the internal RAM when a booting operation of the electronic device begins;

setting a temporary stack pointer in the internal RAM by executing a control code to set the temporary stack pointer among control codes of the boot image;

activating the main memory by executing a control code to initialize the main memory controller and activate the main memory among the control codes of the boot image, the control code to initialize the main memory controller and activate the main memory using the temporary stack pointer; and initializing a display device by executing a control code to initialize the display device among the control codes of the boot image, the control code to initialize the display device being executed between the temporary stack pointer setting step and the main memory activating step.

11. The method as claimed in claim 10, wherein at least one of the control code to initialize the main memory controller, the control code to initialize the display device, and the control code to read out the configuration information data of the main memory is written in a high-level programming language.

12. The method as claimed in claim 11, wherein the high-level programming language comprises one of C, C++, and Java.

13. A booting method of an electronic device which comprises a CPU, an internal RAM, a main memory, a main memory controller to control data input/output between the CPU and the main memory, and a first non-volatile memory for recording a boot image, the method comprising:

copying the boot image from the first non-volatile memory to the internal RAM when a booting operation of the electronic device begins;

setting a temporary stack pointer in the internal RAM by executing a control code to set the temporary stack pointer among control codes of the boot image;

activating the main memory by executing a control code to initialize the main memory controller and activate the main memory among the control codes of the boot image, the control code to initialize the main memory controller and activate the main memory using the temporary stack pointer; and reading out a configuration information data by executing a control code to initialize a second memory controller to read out the configuration information data from a second non-volatile memory among the control codes of the boot image, the control code to read out the configuration information data being executed between the temporary stack pointer setting step and the main memory activating step, wherein the main memory activating step initializes the main memory controller using the read-out configuration information data and activates the main memory.

14. The method as claimed in claim 13, further comprising setting a stack pointer in the activated main memory.

15. The method as claimed in claim 13, wherein at least one of the control code to initialize the main memory controller, the control code to initialize the display device, and the control code to read out the configuration information data of the main memory is written in a high-level programming language.

16. The method as claimed in claim 15, wherein the high-level programming language comprises one of C, C++, and Java.

17. The method as claimed in claim 13, wherein the second non-volatile memory comprises an EEPROM.

18. The method as claimed in claim 13, wherein the second memory controller comprises an I2C controller.

* * * * *